United States Patent [19]

Fenton

[11] 4,255,177
[45] Mar. 10, 1981

[54] GLASSWARE FORMING MACHINES

[75] Inventor: Frank A. Fenton, Doncaster, England

[73] Assignee: Emhart Industries, Inc., Farmington, Conn.

[21] Appl. No.: 24,647

[22] Filed: Mar. 28, 1979

[30] Foreign Application Priority Data

Apr. 10, 1978 [GB] United Kingdom ............... 13972/78

[51] Int. Cl.³ .............................................. C03B 9/93
[52] U.S. Cl. ........................................ 65/79; 65/64; 65/80; 65/230; 65/235; 65/241; 65/260
[58] Field of Search ................... 65/64, 79, 80, 229, 65/230, 235

[56] References Cited

U.S. PATENT DOCUMENTS

| 1,992,510 | 2/1935 | Smith | 65/64 |
| 2,075,363 | 3/1937 | Smith | 65/230 |
| 3,622,305 | 11/1971 | Becker | 65/229 |
| 3,644,111 | 2/1972 | Becker | 65/229 |
| 4,010,021 | 3/1977 | Foster | 65/229 |

FOREIGN PATENT DOCUMENTS 1441099 6/1976 United Kingdom .
1491859 11/1977 United Kingdom .

OTHER PUBLICATIONS

"Stand der Heye Maschinenentwicklung", *Glastechnische Berichte*, Mar. 1975, vol. 48, Issue 3, pp. 43–50.
"The Heye-Maul 1-2 Machine", *Glass Industry*, Oct. 1977, Jack Foyil.

*Primary Examiner*—Arthur D. Kellogg
*Attorney, Agent, or Firm*—H. Samuel Kieser

[57] ABSTRACT

A glassware forming machine has three operating stations, in the first of which a parison is formed in an inverted position. First transfer means transfers a parison from the first station to a second station where the parison is released by the first transfer means in an upright position. A second transfer means receives the released parison at the second station and supports it for a selected time, after which the second transfer means transfers the parison to a third station, releases it and reverts to a position at the second station for receiving a further parison. A third transfer means operative independently of both the first and second transfer means removes an article of glassware from the third station and supports the glassware for a cooling period beyond the third station.

8 Claims, 15 Drawing Figures

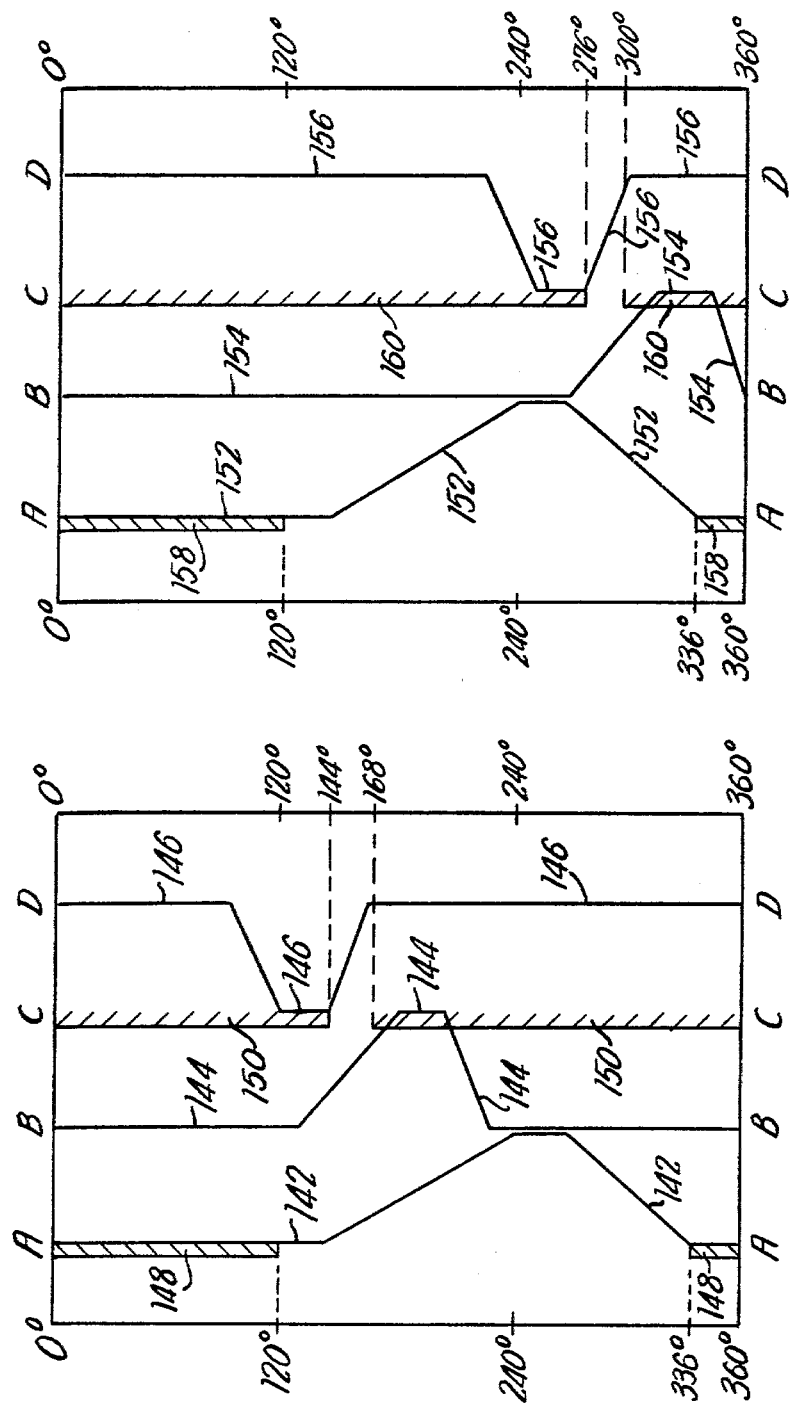
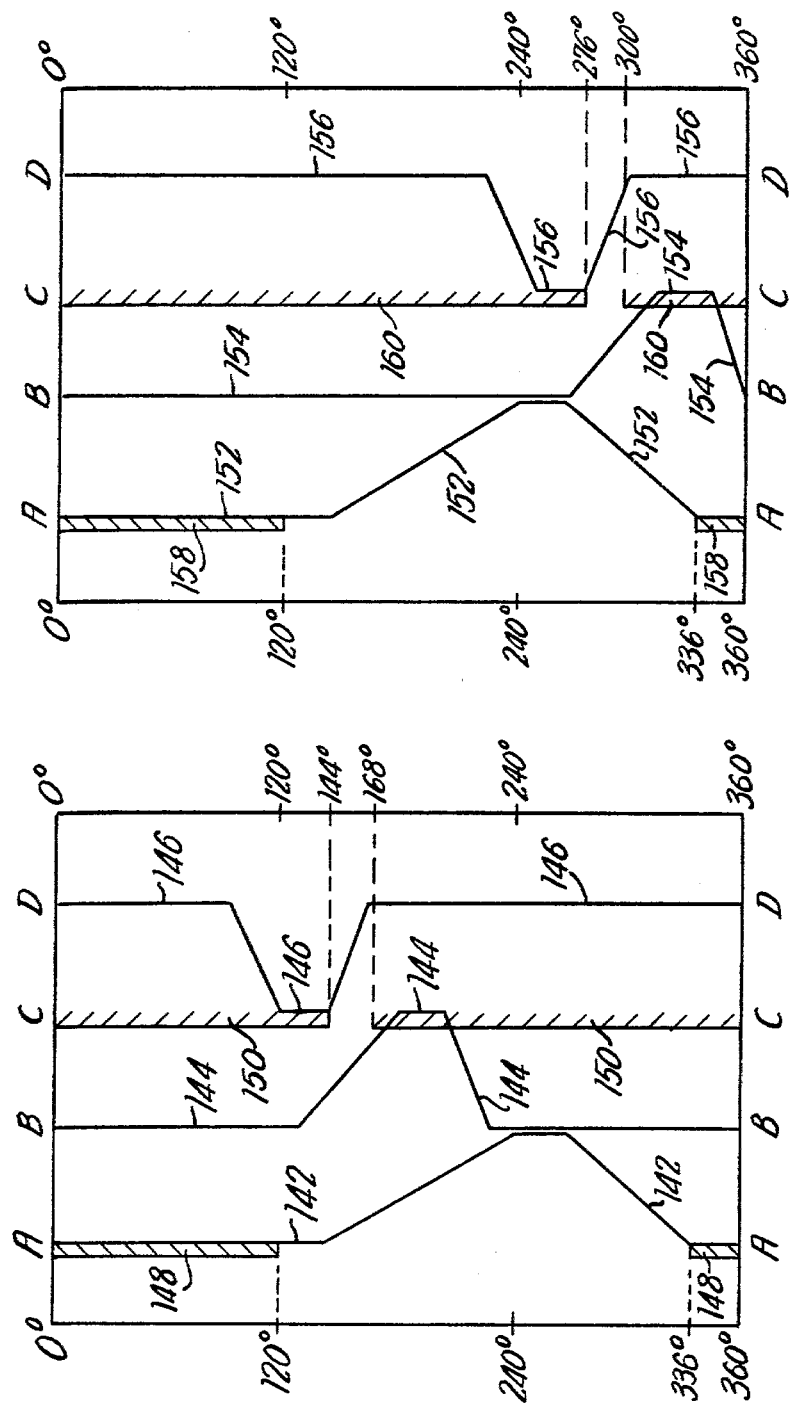

GLASSWARE FORMING MACHINES

CROSS REFERENCES TO RELATED APPLICATIONS

Related inventions form the subject matter of Application Ser. No. 026,646 of THOMAS VINCENT FOSTER, and Application Ser. No. 024,826 of DAVID BRAITHWAITE, both filed on the same day as the present Application.

BACKGROUND OF THE INVENTION

This invention relates to individual sections of multiple section glassware forming machines and to processes of forming glassware using such machine sections.

In co-pending patent application Ser. No. 026,646 of Thomas Vincent Foster, filed on the same day as the present Application there is described and claimed an individual section of a multiple section glassware forming machine which comprises three operating stations which are, respectively, a first station including a blank mould for forming a parison, a second station in which reheating of a parison takes place, and a third station including a blow mould for finally shaping an article of glassware, and independently operable first and second transfer means, the first transfer means including a neck ring structure and actuating means for moving the neck ring structure from a first position in which the neck ring structure engages a parison in the blank mould at the first station to a second position in which the neck ring structure releases a parison at the second station and returning the neck ring structure from the second position to the first position prior to the formation of another parison in the blank mould at the first station, and the second transfer means including gripping means and actuating means for moving the gripping means between a first position in which the gripping means engages a parison at the second station and a second position in which the gripping means holds the parison in such a location at the third station that the blow mould at the third station can close around the parison.

In the glassware machine sections of the said co-pending Patent Application, the second transfer means includes first and second gripping means which are movable simultaneously between first and second positions by the second transfer actuating means, the second gripping means transferring the shaped articles of glassware from the third station to a takeout position, for example a deadplate.

In the said co-pending Patent Application the group of machine functions for forming a parison from a gob of molten glass at the first station is defined collectively as a primary cycle. The group or sequence of machine functions for forming an article of glassware in a blow mould at the third station is similarly defined as a secondary cycle. The apparatus described and claimed in the said co-pending Patent Application enables the time for which the parison is reheated after its formation in the primary cycle and before the formation of the article of glassware in the secondary cycle to be adjusted without altering the time of operation of any of the machine functions included in either the primary cycle or the secondary cycle relative to the timing of any other of the machine functions included in the same cycle. Thus, when the reheating time of the parison is altered a corresponding consequential change is effected in at least one of the groups of machine functions respectively constituting the primary cycle and the secondary cycle. Such a process is also claimed in the said co-pending Application.

In one of the embodiments of apparatus described in the said co-pending Patent Application the first station includes means including a blank mould for forming a parison in an inverted position, and the present invention is particularly concerned with an improvement in and modification of this embodiment of the invention described with reference to FIGS. 1 to 8 of the said co-pending Patent Application.

SUMMARY OF THE INVENTION

According to the present invention there is provided a process of forming glassware from a gob of molten glass in an individual section of a multiple section glassware forming machine, which section has three stations spaced apart longitudinally of the section, wherein a primary cycle comprising the machine functions for forming a parison in an inverted position from the gob of molten glass is performed in the first of said stations, a secondary cycle comprising the machine functions for forming an article of glassware in a blow mould is performed at the third of said stations, the parison is moved from the first station to the second station in a first time by a first transfer means which presents the parison in an upright position at the second station, the parison is moved from the second station to the third station by a second transfer means in a second time, the article of glassware is removed from the third station to a takeout position beyond the third station by a third transfer means in a third time, whereby the period elapsing between the time at which the first transfer means presents the parison to the second station and the time at which the second transfer means moves the parison from the second station to the third station is adjustable without altering the relative timing of any of the machine functions comprised within either the primary cycle or the secondary cycle, and wherein each of the parison, the further formed parison, and the article of glassware is moved by the first, second and third transfer means, respectively, at rates of acceleration suitable for the condition of the glass contained therein at the time of movement.

Also in accordance with the present invention there is provided an individual section of a multiple section glassware forming machine which comprises: means including a blank mould located at a first station for forming a parison in an inverted position from a gob of molten glass delivered to the blank mould at the first station, first transfer means engaging the parison finish for removing the parison from the first station and presenting the parison in an upright position at a second station, second transfer means for supporting a parison at the second station and moving the parison from the second station to locate the parison in a position for engagement by a blow mould at a third station, and third transfer means for engaging an article of glassware at the third station and moving the article of glassware to a position where it is supported by the third transfer means over a deadplate, the first, second and third transfer means including, respectively, first, second and third actuating means for moving the respective transfer means, each of the first, second and third actuating means being movable independently of the other two actuating means, whereby each of the first, second and third transfer means is movable at times and rates of acceleration independent of the times and rates of acceleration of the other transfer means.

BRIEF DESCRIPTION OF THE DRAWINGS

The present invention will be further understood from the following detailed description which is made, by way of example, with reference to the accompanying drawings in which:

FIG. 10 is a schematic breakdown of one process cycle performed using the apparatus of FIGS. 1 to 9.

FIG. 11 is a schematic breakdown similar to FIG. 10 of another process cycle in accordance with the present invention showing the manner in which the reheat time may be varied in different process cycles without effecting any alteration of the relative timing of the machine functions which comprise the primary cycle or of the relative timing of the machine functions which comprise the secondary cycle.

In the drawings the same or similar parts are designated by like reference numerals.

DETAILED DESCRIPTION

Figure 1:
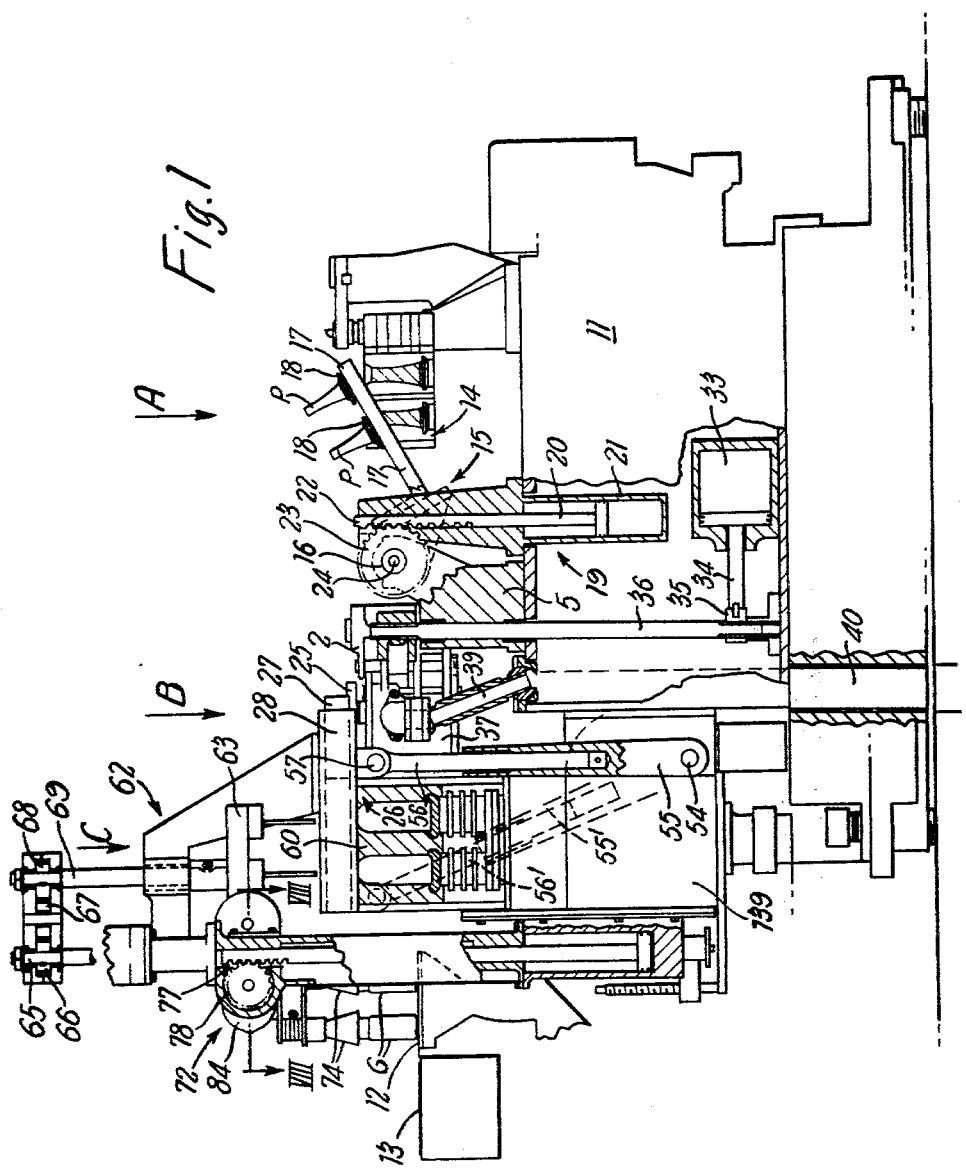
FIG. 1 is a side view in part section of apparatus in accordance with the present invention having three independent transfers, the first transfer being an inverting mechanism such as is used on a conventional I.S. machine, a second transfer including support jaws for supporting parisons at a second station and transferring the parisons from the second station to a third station in a straightline movement, and a third transfer for taking out finally shaped articles of glassware from the blow mould at the third station.
Figure 2:
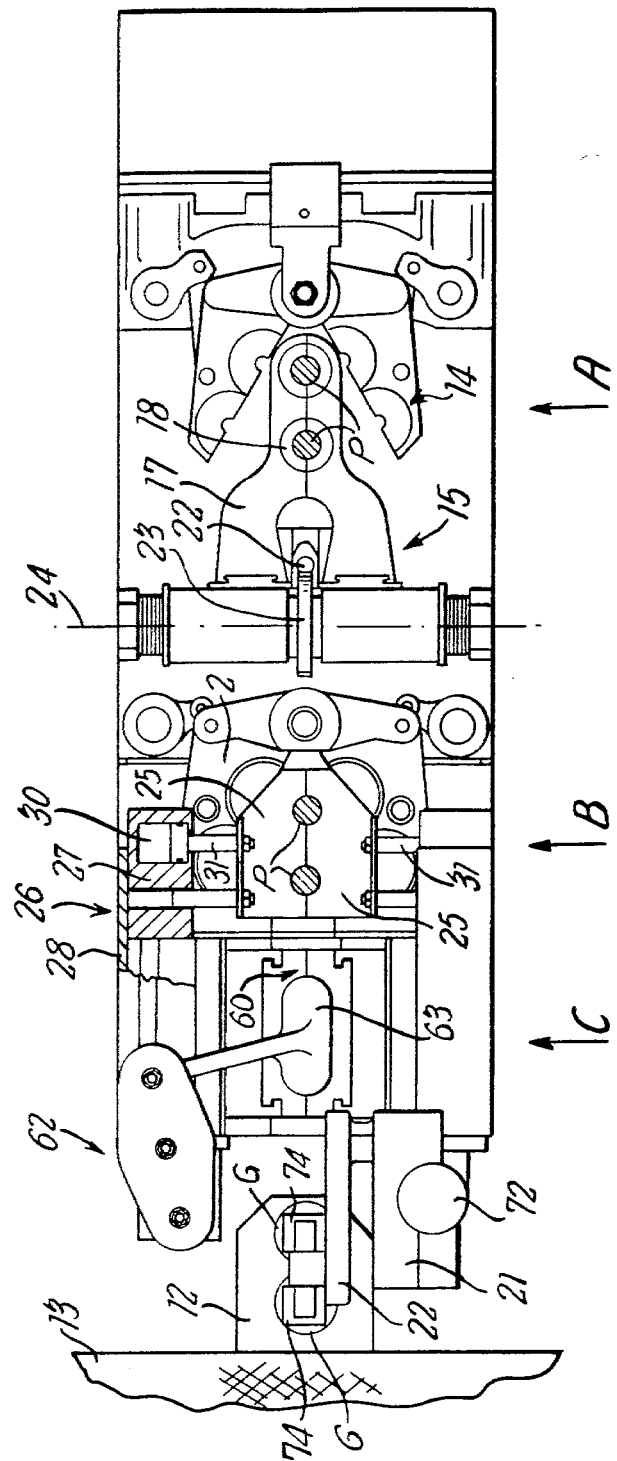
FIG. 2 is a plan view of the apparatus of FIG. 1, showing in section the operating means for the support jaws of the second transfer means.

Referring to the accompanying drawings and firstly to FIGS. 1 and 2 there are shown diagrammatically side elevation and plan views of a preferred embodiment of apparatus according to the present invention which comprises an individual section of a glassware forming machine having three operating stations or areas provided in spaced apart relationship along the longitudinal centre line of the section, these stations being designated generally as a first station A, a second station B and a third station C. The machine section shown is particularly adapted for "double gob" operation wherein a pair of glassware parisons are initially formed at the station A in an inverted position and then transferred to the station B where they are supported for reheating and other further forming as desired, and then transported to the station C for final shaping as articles of glassware, such as bottles. When the glassware articles have been finally shaped at station C they are moved out of the machine section on to a deadplate 12, and they are thereafter moved on to a takeaway conveyor 13 where they are placed in line with other similar articles formed by the other individual sections of the forming machine.

The mechanism for forming the parisons in an inverted position at station A may be any well known mechanism for forming a parison by either pressing or blowing as in the conventional I.S. machine. The parison-forming apparatus at station A may be, for example, either the apparatus described in U.S. Pat. No. 1,911,119 for forming a parison at a parison-forming or blank station by blowing, or the apparatus described in U.S. Pat. No. 2,508,890 for forming a parison by pressing. Parison or blank moulds 14, 14 are shown in FIG. 1 but the remainder of the parison-forming apparatus is not illustrated in detail in the accompanying drawings. Although the parisons formed using apparatus in accordance with the present invention may have either single bead or double bead finishes, the description which follows will relate to the manufacture of parisons having single bead finishes.

When the parisons have been formed at station A and the blank moulds 14, 14 have been opened, a first transfer means indicated generally by the reference numeral 15 is operated to move the parisons P, P from the inverted positions in which they were formed at station A to station B. The first transfer means 15 includes a rotatable shaft 16 to which there is mounted an arm 17, which carries a pair of neck rings 18, 18, and an actuating means 19 (FIG. 1) which comprises a device having a piston 20 and a cyclinder 21, a rack extension 22 (FIGS. 1 and 2) on the piston 20, the rack 22 being engageable with a gear 23 also mounted on the shaft 16 for rotation about an axis 24 to rotate the arm 17 from the position shown to a position at which the parisons held in the neck rings 18, 18 are presented to support jaws 25, 25 at station B. This operation of the first transfer means 15 causes the parisons P, P to be inverted from the upside down positions in which they were formed at station A to upright positions at station B.

The position in which the first transfer means 15 presents the parisons upright at station B is the second position of the first transfer means. The first position of the first transfer means 15 is that in which the neck rings 18, 18 are located at station A to form part of the blank moulds 14, 14.

At the time when the parisons P, P are delivered to station B by the first transfer means 15 there is already positioned at station B a pair of support jaws 25, 25 which form part of a second transfer means indicated generally on FIG. 2 by the reference numeral 26. The second transfer means 26, parts of which are illustrated in more detail in FIGS. 4 to 6, comprises a carriage 27, guide means 28 (FIG. 6) in the form of slides which are engaged by the carriage 27, and actuating means for moving the carriage 27 relative to the guide means 28. In FIGS. 1 and 2 the second transfer means 26 is shown in its first position when the carriage 27 and the support jaws 25, 25 mounted thereon are located at station B.

Figure 6:
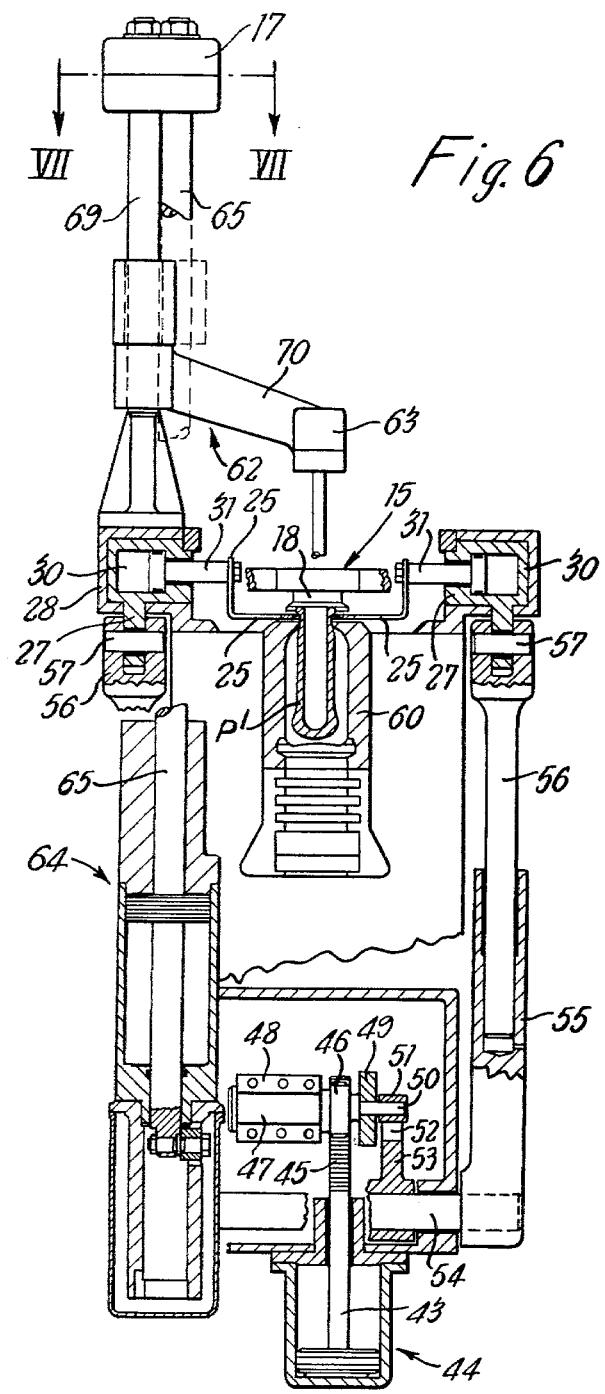
FIG. 6 is a view of the apparatus of FIGS. 1 and 2 looking from the lefthand side of FIG. 2 with the third transfer means not shown but parts of the first and second transfer means shown in section with part of the blowhead mechanism and the blow moulds at the third station also shown sectioned.

Referring particularly to FIGS. 2 and 6, the carriage 27 carries piston and cylinder devices 30 (one of which is shown in FIG. 2 in section) the pistons 31, 31 of which each carry a respective one of the support jaws 25, 25.

As soon as the parisons P, P come to rest at station B as a result of the movement of the first transfer means 15 from its first position to its second position, the piston and cylinder devices 30, 30 of the second transfer means 26 are actuated so that the support jaws 25, 25 of the second transfer means 26 close around the necks of the parisons P, P as shown particularly in FIG. 2. The support jaws 25, 25 are also shown closed in FIG. 6, but this Figure represents a later stage of the process in which the parisons P have been moved from station B to station C.

When the support jaws 25, 25 are fully closed about the necks of the parisons, the neck rings 18, 18 of the first transfer means 15 are opened to release the parisons which drop a short distance until their beads or finishes are supported by the support jaws 25, 25. The first transfer means 15 then reverts from its second position at station B to its first position at station A for formation of succeeding parisons at station A. The neck ring structures 18, 18 are closed during the revert movement of the first transfer means 15 from station B to station A.

Figure 3:
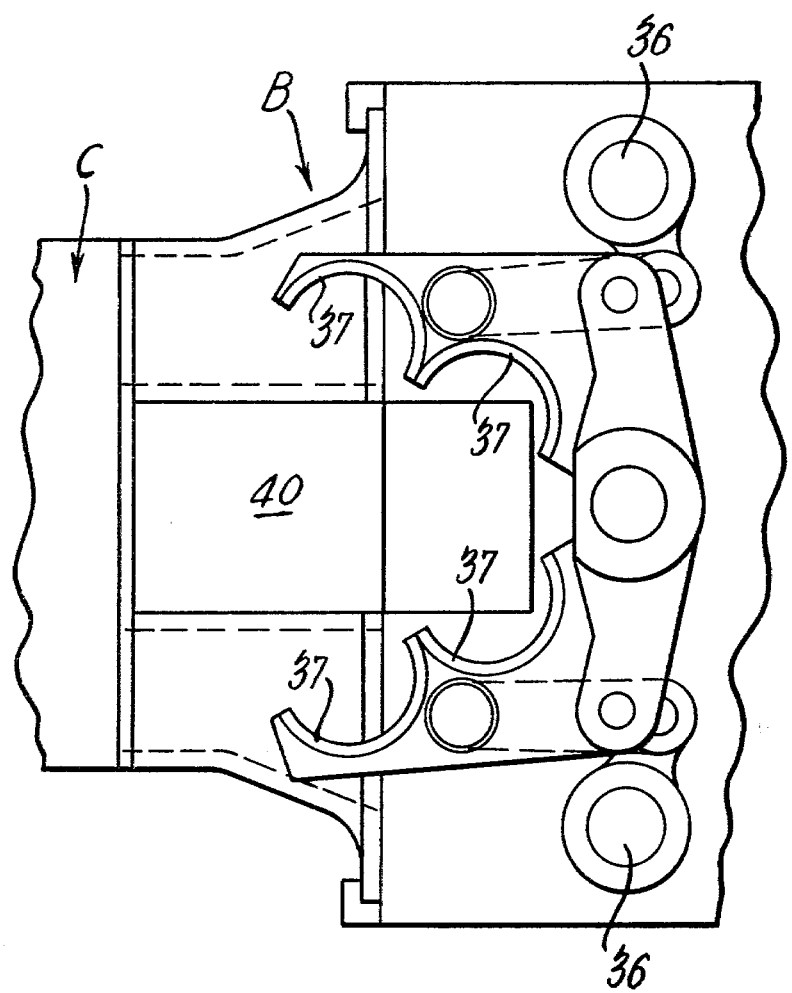
FIG. 3 is an enlarged view of that part of FIG. 2 showing the parison shrouds and the operating linkage for closing the shrouds.

Substantially simultaneously with the closing of the support jaws 25, 25 by the action of piston and cylinder devices 30, 30, a further piston and cylinder actuating device 33 (FIG. 1) is operated from its rest position to the position shown in that Figure in which the piston 34 of the device 33 has moved linkages 35 to rotate vertical shafts 36, 36 (FIGS. 2 and 3) which are part of a mechanism for closing pairs of shrouds 37, 37 (FIGS. 3, 4 and 5) about the parisons. The mechanism for closing the shrouds may conveniently be the same as the conventional mechanism for closing blow moulds in an I.S. machine.

Figure 4:
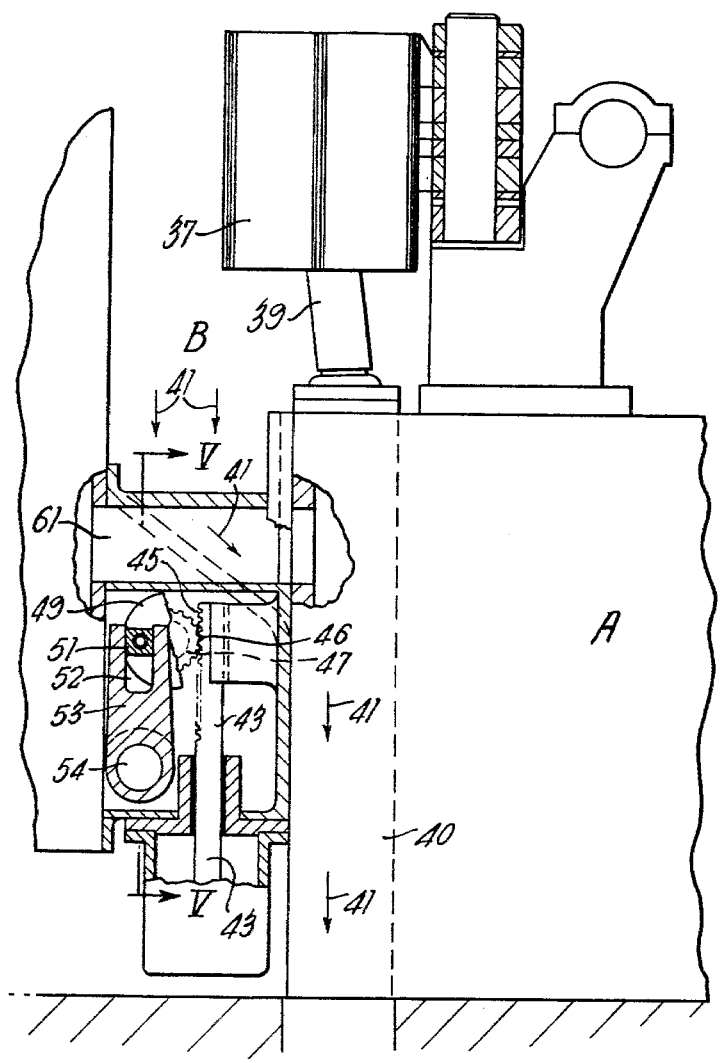
FIGS. 4 and 5 are respectively side and end views of part of the apparatus at station B including the shrouds and part of the actuating mechanism of the second transfer means, which latter is shown sectioned, the sections through the operating mechanisms being taken along the lines IV—IV of FIG. 5 and V—V of FIG. 4, respectively.
Figure 5:
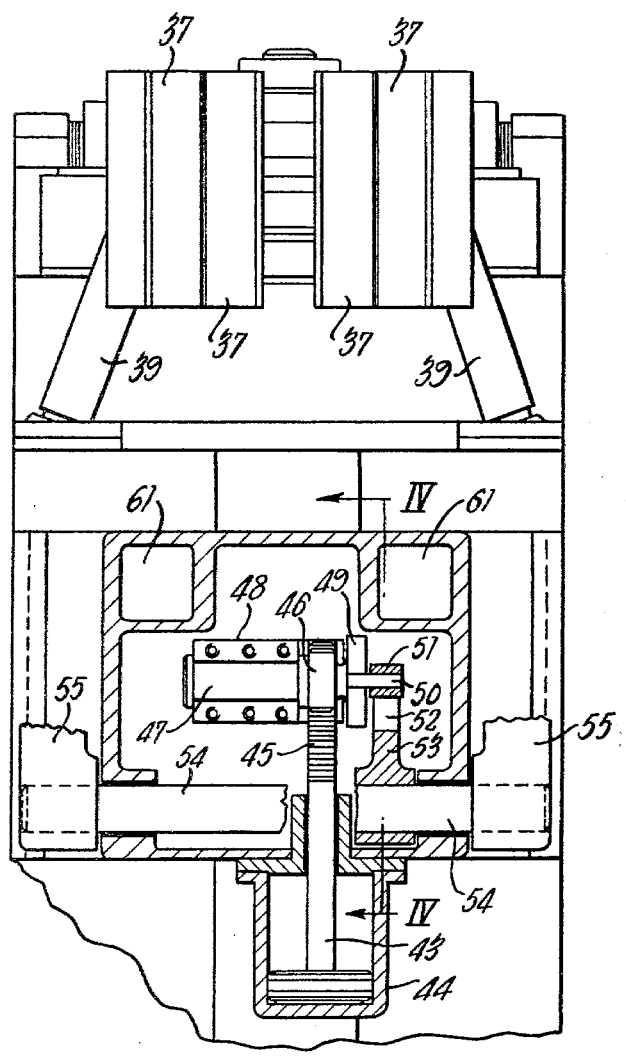

The shrouds 37, 37 each surround one parison P so that that parison P is protected from radiation from the other parison P and also from extraneous unwanted cooling effects. However, if desired, cooling wind can be admitted through the shrouds 37, 37 to cool the parisons P, P selectively and in a controlled manner so that the stretching (run) of the parisons during reheating at station B is influenced to produce a specially desired shape of parison for loading to the blow mould at station C. Alternatively, or additionally, chemical treatments, for example coating with tin, can be undertaken at station B by admitting a suitable chemical through the shrouds 37, 37 for example to influence the surface characteristics such as the surface strength of the parisons. Referring to FIGS. 1, 4 and 5 a tube 39 is shown permitting the introduction of cooling air or coating vapour to parisons within the volume enclosed by the shrouds 37, 37.

As shown in FIGS. 1 and 4 the bottom of station B is formed with a chute 40 providing a means for removal of cullet rejected from station B. The path of cullet falling down the chute 40 is indicated by the arrows 41 in FIG. 4.

After a selected time the carriage 27 of the second transfer means is moved along the guide means 28 from its first position at station B to its second position at station C by the actuating means of the second transfer means which will now be described with reference to FIGS. 4 and 5 and the end section of FIG. 6.

In order to effect movement of the second transfer carriage 27 from station B to station C a piston 43 of a piston and cylinder device indicated generally by the reference numeral 44 is moved from its upper position to its lower position, which lower position is the position shown in FIGS. 4 to 6. During this movement, rack 45 formed on the piston 43 rotates a gear 46 with which it engages so that a shaft 47, to which the gear 46 is mounted, is rotated in a clockwise direction as seen in FIG. 4.

The shaft 47 is supported at one end by a bearing 48 and the other end of the shaft 47 supports a wheel 49 which carries an eccentrically mounted pin 50. Free to rotate on the pin 50 is a square 51 which is slidable in a slot 52 of an arm 53 which is mounted to a cross-shaft 54. Accordingly, the rotation of the shaft 47 consequent upon the downward movement of the piston 43 has the effect of moving the pin 50 and the square 51 freely rotatable thereon through a semicircle in a clockwise direction to the position shown in FIG. 4 with consequential rocking of the cross-shaft 54 in an anti-clockwise direction.

Also mounted to the cross-shaft 54 are a pair of arms 55, 55 which constitute driving arms for the second transfer carriage 27. Slidably mounted within each driving arm 55 is a rod 56 which is connected directly to the second transfer carriage 27 by a connecting pin 57. When the cross-shaft 54 is rocked as previously described, the driving arms 55 are moved from the position shown in full lines in FIG. 1 to the position shown in dashed lines at 55' with consequential movement of the second transfer carriage 27 from its first position at station B to its second position at station C. During this movement the rods 56 slide in the driving arms 55 thereby compensating for the change in distance between the cross-shaft 54 and the position at which the pin 57 connects the actuating means of the second transfer means to the carriage 27 of that second transfer means.

The movement of the carriage 27 as described causes the support jaws 25, 25 holding further formed parisons to be moved from their first position at station B to their second position in which they present the further formed parisons P' for engagement by blow moulds 60 at station C (as shown in FIG. 6). This movement of the carriage 27 is a movement approximating to a simple harmonic motion.

In FIG. 5 there are shown passages 61 formed in the frame structure in order to transfer cooling air for the blow moulds from the normal I.S. inlets for cooling air, which in the standard I.S. machine are located at station B, to the blow mould structure which in this embodiment of the present invention is located at station C.

Figure 8:
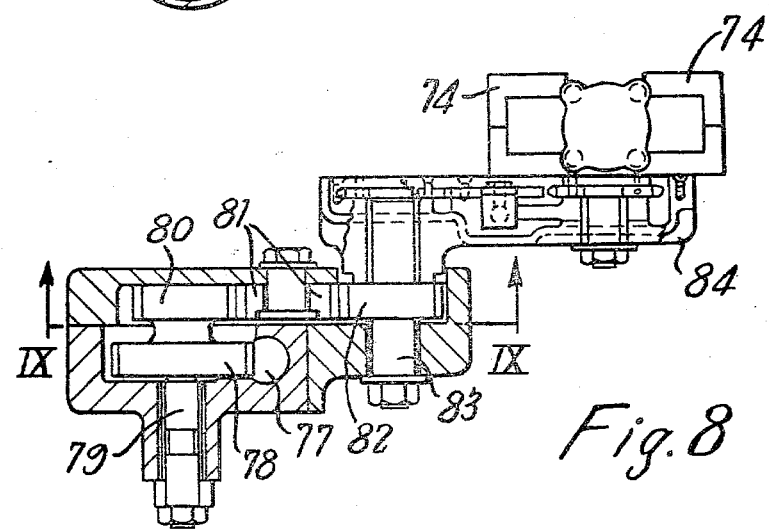
FIG. 8 is a cross-sectional view of the actuating mechanism of the third transfer means taken along the line VIII—VIII of FIG. 1.

The blow mould structure at station C is not illustrated in detail in the accompanying drawings, but may advantageously be similar to the blow mould structure illustrated in FIG. 8 of the said U.K. Pat. No. 1,491,859.

Figure 7:
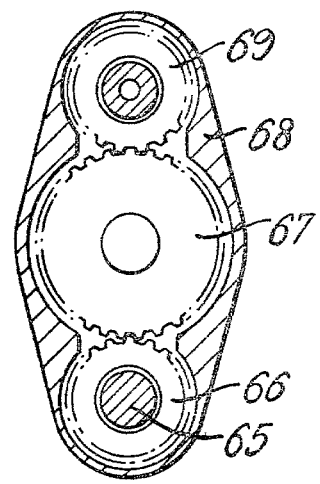
FIG. 7 is a horizontal section of part of FIG. 6 taken along the line VII—VII of FIG. 6.

However, in contrast to the apparatus disclosed in the said U.K. Patent, the machine section in accordance with the present invention has a blowhead assembly 62 (FIGS. 1, 2 and 6) which includes a blowhead 63, located at station C as part of the structure at that station. The operating mechanism for raising and lowering the blowhead 63 is essentially the same as that conventionally used on the I.S. machine and gives to the blowhead both a lifting and a twisting motion. In the apparatus which is being described with reference to the accompanying drawings, which is a conversion of a standard I.S. machine to a three station apparatus having three independent transfers, a conventional I.S. blowhead drive mechanism 64 (FIG. 6) is employed, and the rotation of the I.S. drive shaft 65 is transferred through a coupling mechanism comprising a gear 66 (FIG. 7) mounted on the drive shaft 65 through an idler gear 67 to a gear 68 mounted on a shaft 69 which supports arm 70 carrying the blowhead 63.

Immediately after the arrival of the further formed parisons at station C, the blow moulds 60, 60 at station C are closed about the further formed parisons P' and the support jaws 25, 25 of the second transfer means 26 are opened, thus releasing the further formed parison P' which drop a further short distance so that their beads or finishes are supported by the necks of the closed blow moulds 60, 60. When the support jaws 25, 25 are fully open the second transfer means 26 is operated so that the support jaws 25, 25 are returned to their rest position at station B which is the first position of the second transfer means 26. The blowhead assembly 62 at station C is lowered so that blowheads 63 thereon engage the necks of the further formed parisons P' supported in the blow moulds 60, 60 at station C.

Preferably, the final shaping of the articles of glassware G, G is effected primarily by application of reduced pressure to the interior of the blow moulds 60, 60 with simultaneous application of a blow to the interior of the further formed parisons to assist in the final shaping and to extract heat from the interior of the glass. Alternatively, the final shaping of the articles of glassware G, G may be effected solely by blowing using the blowhead assembly 62. However, a longer shaping time in the blow moulds 60, 60 is available when a reduced pressure (vacuum) forming is employed because the application of the reduced pressure may be effected as soon as the blow moulds 60, 60 are closed and without waiting for the blowhead assembly 62 to be operated to bring the blowheads into engagement with the necks of the further formed parisons P' after the support jaws 25, 25 of the second transfer means 26 have been moved from their second position at station C back to their first position at station B.

When the final shaping of the articles of glassware G, G in the blow moulds 60, 60 at station C has been completed, the blowhead assembly 62 is raised away from the necks of the articles of glassware G, G. Simultaneously, a third transfer means 72 including tongs 74, 74 is moved in from its second position (shown in FIG. 1), in which the tongs 74, 74 are over the deadplate 12, to its first position in which the tongs 74, 74 are located over the blow moulds 60, 60 at station C. The blow moulds 60, 60 at station C then open and the tongs 74, 74 close around the respective articles of glassware G, G which are resting on the base plates of the blow moulds. The third transfer means 72 is then operated from its first position to its second position so that the tongs 74, 74 move the articles of glassware G, G from the base plates of the blow moulds 60, 60 at station C to a position in which the tongs 74, 74 support the articles of glassware G, G over the deadplate 12.

The articles of glassware G, G are held by the tongs 74, 74 over the deadplate 12 until a time shortly before the third transfer means 72 is required to move back to its first position. At this time the tongs 74, 74 are opened to release the articles of glassware, preparatory to the operation of the third transfer means 72 from its second position to its first position.

Figure 9:
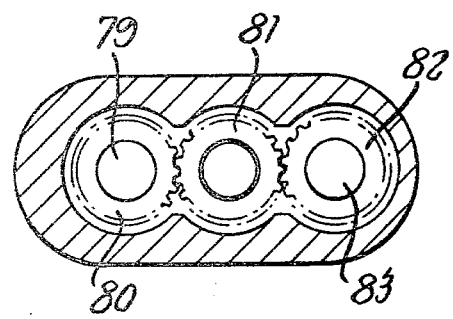
FIG. 9 is a sectional view of part of the apparatus of FIG. 8 taken along the line IX—IX of FIG. 8.

The third transfer means 72, details of which are shown more specifically in FIGS. 8 and 9, is essentially similar in operation to the take-out means of a conventional I.S. machine and moves the articles of glassware G, G in an arcuate motion from station C to a take-out position over the deadplate 12. However, in the third transfer means 72 of the illustrated embodiment of the present invention the drive from piston and cylinder actuating means 76 (FIG. 1) through rack extension 77 and gear 78 to shaft 79 (FIGS. 8 and 9) is transferred via a further gear 80 on shaft 79 through an idler gear 81 to a gear 82. Gear 82 is the drive gear for shaft 83 to which is mounted arm 84 which carries the tongs 74, 74 in manner similar to the conventional I.S. take-out mechanism.

Preferably the third transfer means causes the articles of glassware to be moved from the third station to the position over the deadplate in the shortest practicable time.

A first example of the operation of the machine section illustrated in FIGS. 1 to 9 to produce articles of glassware by a press and blow process is now given in Table A below. In this table the times during the process cycle of the machine section during which certain machine functions are performed are set out in terms of a 360° cycle. These cycle times in degrees may be readily converted into appropriate data form representative of the desired times for actuation of an electronic timing system to control the machine section, for example the electronic timing system described in U.K. Pat. No. 1,441,099.

TABLE A

| Time | STATION A | STATION B | STATION C | DEADPLATE |
|---|---|---|---|---|
| 0° | Load gobs | | | |
| 72°–96° | | | | Take-out tongs open |
| 96°–120° | Blank mould opens | | Blowhead raise | ←3rd transfer |
| 120°–144° | | | Blow mould open and take-out tongs close | |
| 132°–180° | | 2nd transfer → | | |
| 144°–168° | | | | 3rd transfer → |

TABLE A-continued

| Time | STATION A | STATION B | STATION C | DEADPLATE |
|---|---|---|---|---|
| 144°-240° | | 1st transfer Invert → | | |
| 168°-192° | | | Blow mould close | |
| 180°-204° | | | Support jaws open | |
| 192°-216° | | | Blowhead lower | |
| 204°-228° | | ← 2nd transfer | | |
| 228°-252° | | Support jaws close | | |
| 240°-264° | | Neck rings open | | |
| 264°-336° | | ← 1st transfer Revert | | |
| 336°-360° | Blank mould closes and funnel on | | | |

The movements of the first, second and third transfer means illustrated in Table A are also shown by the lines 142, 144 and 146, respectively, in FIG. 10 which is a schematic illustration of the operation of the process cycle of Table A.

The whole group or sequence of machine functions which together comprise the primary cycle during which the parison is formed at station A start at 336° in one process cycle of the machine section. This is the time when the neck rings 18, 18 come to rest at station A at the end of the revert movement of the first transfer means 15 and therefore the time at which the blank moulds 14, 14 commence to close. The primary cycle ends at 120° in the succeeding machine section cycle when the blank mould is fully open and therefore the total time of the primary cycle is 144°, the primary cycle being represented in FIG. 10 by the cross-hatched area 148.

Referring again to Table A it will be seen that the further formed parisons P', P' are supported in the blow moulds 60, 60 at station C for a time extending from 192° in one cycle to 120° in the succeeding cycle of the machine section, i.e. 288°.

The whole group or sequence of machine functions which together comprise the secondary cycle performed at station C in order to form articles of glassware G, G from the further formed parisons P', P' extends from the commencement of the closing of the blow moulds 60, 60 at station C at 168° in one process cycle of the machine section to the instant at which the blow moulds 60, 60 are again fully open at 144° in the succeeding process cycle of the machine section as represented in FIG. 2 by cross-hatched area 150, i.e. 336°.

Therefore, the duration of the primary cycle is 144° and the duration of the secondary cycle is 336°, while the parisons P, P are supported by the support jaws 25, 25 of the second transfer means for a period of 288°, i.e. from 252° in one machine section cycle at which the support jaws 25, 25 become fully closed at station B to 180° in the succeeding machine section cycle when the support jaws 25, 25 start to open at station C.

A second example of the operation of the machine section illustrated in FIGS. 1 to 9 to produce articles of glassware by a press and blow process is now given in Table B below:

TABLE B

| Time | STATION A | STATION B | STATION C | DEADPLATE |
|---|---|---|---|---|
| 0° | Load gobs | | | |
| 96°-120° | Blank mould opens | | | |
| 144°-240° | | 1st transfer Invert → | | |
| 204°-228° | | | | Take-out tongs open |
| 228°-252° | | Support jaws close | Blowhead raise | ← 3rd transfer |
| 240°-264° | | Neck rings open | | |
| 252°-276° | | | Blow mould opens and take-out tongs close | |
| 264°-312° | | 2nd transfer → | | |
| 276°-300° | | | | 3rd transfer → |
| 264°-336° | | ← 1st transfer Revert | | |
| 300°-324° | | | Blow mould close | |
| 312°-336° | | | Support jaws open | |
| 324°-348° | | | Blowhead lower | |
| 336°-360° | Blank mould closes and funnel on | ← 2nd transfer | | |

The movements of the first, second and third transfer means illustrated in Table B are also shown by the lines 152, 154 and 156, respectively, in FIG. 11 which is a schematic illustration of the operation of the process cycle of Table B.

Referring to the process of Table B, the primary cycle, which consists of the group of machine functions performed at station A, is identical with the primary cycle of the process cycle of the machine section described in Table A and illustrated in FIG. 10. Accordingly, the primary cycle of the machine section process cycle of Table B is illustrated in FIG. 11 by cross-hatched area 158.

The secondary cycle of the machine section process cycle of FIG. 11 as described in Table B extends from the commencement of the closing of the blow moulds 60, 60 at station C at 300° to the instant when the blow moulds 60, 60 are again fully open at 276° in the succeeding process cycle of the machine section. The machine functions within this secondary cycle (denoted in FIG. 11 by cross-hatched area 160) accordingly extend over a period of 336°, and the secondary cycle of Table B (like that primary cycle of the table) contains machine functions arranged in identical timed relation to the corresponding cycle of Table A.

However, in the process cycle illustrated in Table B and FIG. 11, the parisons P, P are supported in the support jaws 25, 25 of the second transfer means from the instant when these jaws are fully closed at 252° to the instant when the jaws commence to open at 312°, a total time of only 60°. There is therefore a decrease in the reheat time of the parisons of 228° in the process cycle of Table B and FIG. 11 as compared with the process cycle of Table A and FIG. 10. The apparatus in accordance with the present invention therefore incorporates the same substantial flexibility in the reheating time of the parisons, without any corresponding changes being required to be made within either the primary cycle or the secondary cycle, that is shown by the apparatus described and claimed in the said co-pending patent application.

The manner in which operation of the apparatus in accordance with the present invention as hereinbefore described is changed, for example from the process cycle of FIG. 10 to the process cycle of FIG. 11 by moving all the machine functions which comprise either or both of the primary and secondary cycles will now be described with reference to FIGS. 12 to 15.

Figure 12:
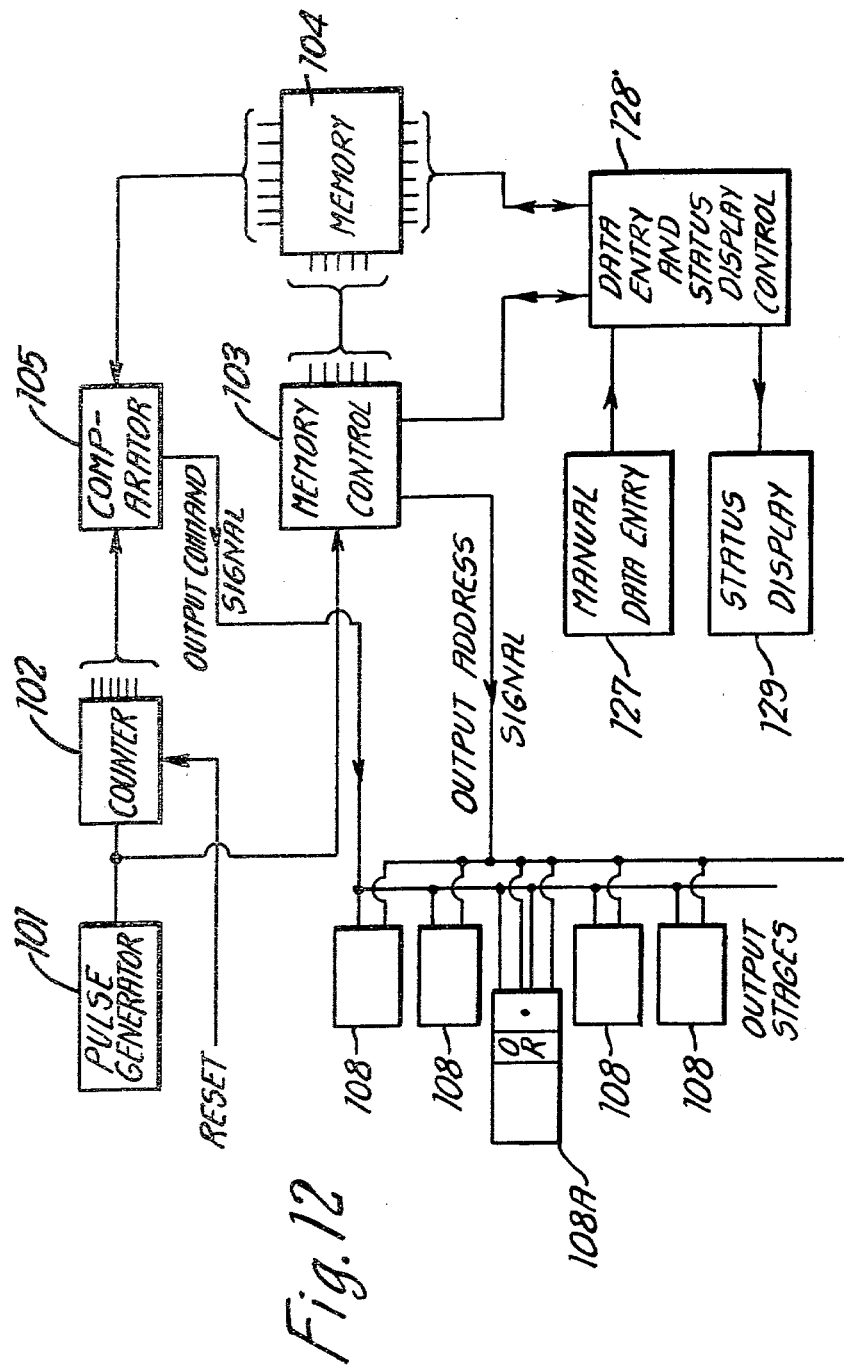
FIG. 12 is a block diagram of a system for operating a process in accordance with the present invention and as exemplified in FIGS. 10 and 11.

Referring to FIG. 12 there is shown diagrammatically an operating circuit for controlling the various events or machine functions in the machine sections which together comprise a multiple section glassware forming maching in accordance with the present invention. The circuit of FIG. 12 is similar to the circuit of U.K. Pat. No. 1,441,099. The logic sequence performed by the circuit of FIG. 12 is shown in FIG. 13.

Pulses from a pulse generator 101 are fed to a counter 102 and to a memory control 103. At the receipt of each pulse which advances the counter 102 on step in a count from 0 to 1023, the same pulse triggers the memory control 103 to initiate a scan of all the information concerning the events of the glassware forming cycle which are stored in a mamory 104. The memory 104 may, for example, be a ferrite core store, and the memory control 103 controls the scan of the memory and the feeding of information representing event ON and OFF counts to a comparator 105 in which the ON and OFF counts are compared with the count in the counter, and an appropriate output command signal is given from the comparator 105.

Figure 13:
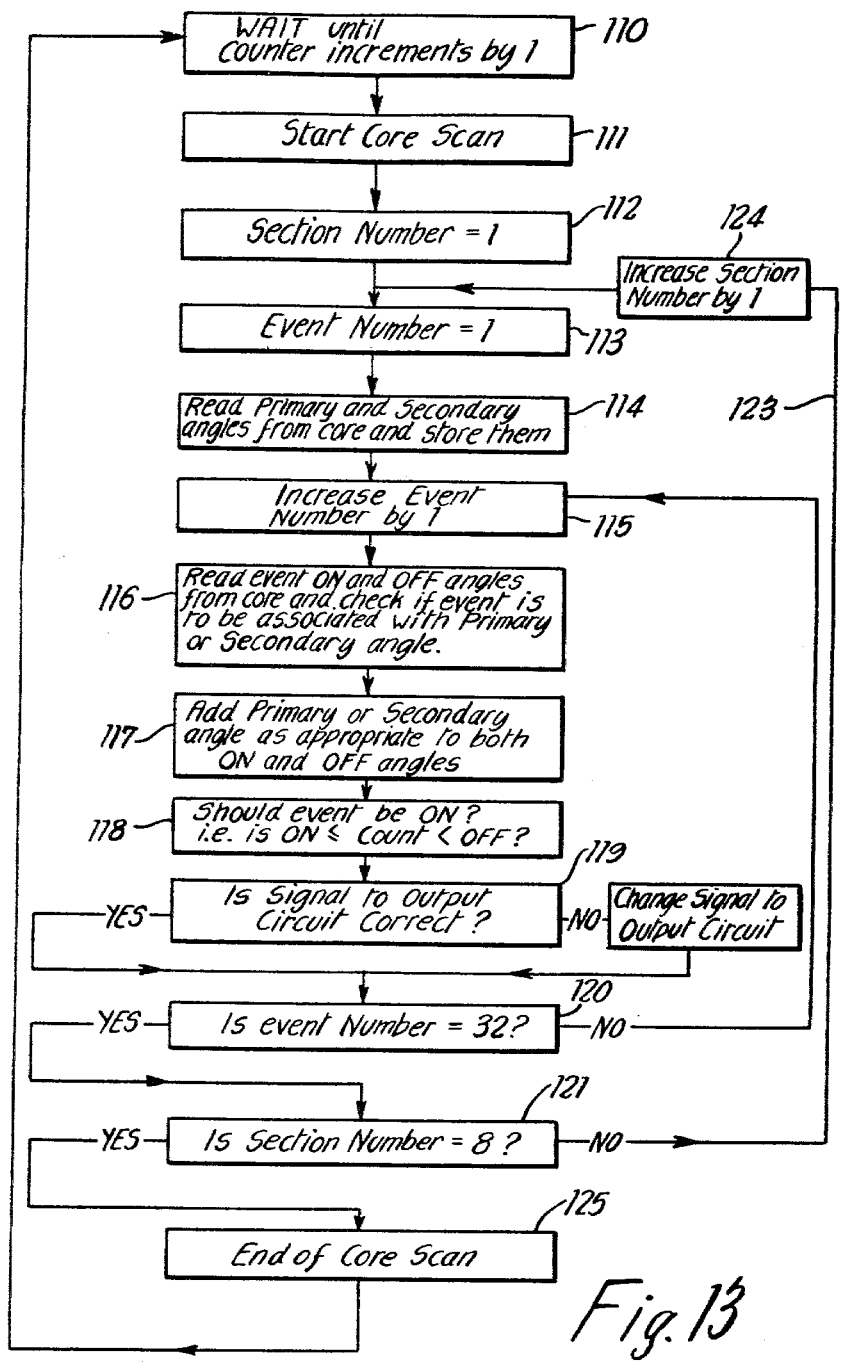
FIG. 13 is a logic sequence diagram showing the steps performed in carrying out the process in accordance with the present invention.

The logic sequence with which the memory control 103 controls the memory 104 to feed information to the comparator 105 and produce output command signals is illustrated in the logic sequence diagram which is FIG. 13.

Referring to FIG. 13 the receipt of a pulse from the pulse generator to advance the counter 102 to the next count figure, e.g. from 0920 to 0921, has the effect of activating the memory control 103 from the waiting condition in which it was waiting as indicated at 110 in FIG. 13, and initiates a core scan sequence as represented by box 111 in FIG. 13. At the start of the core scan the memory control 103 moves to the next step and interrogates the memory 104 by specifying that the section number shall equal 1 as indicated by box 112 and then that the event number shall equal 1 as specified by box 113.

Stored in electronic event number 1 of the memory 104 for each section are primary and secondary angles for the respective section. The primary and secondary angles are counts which may be chosen independently of one another but the values of which determine the relationship of the group of events or machine functions which comprise the primary cycle to the group of events or machine functions which comprise the secondary cycle. The actual count at which a machine function or event in, for example, the primary cycle takes place is determined by adding a count representative of the event ON and OFF angles to the count representative of the primary angle. Thus it may be seen that, by changing the count which represents the primary angle, the times at which all the events which comprise the primary cycle take place are changed by the same amount, whilst no corresponding change is made in the times or counts at which the events of the secondary cycle take place. On the other hand, the time at which any event in the primary cycle takes place relative to the other events in the primary cycle is changed by altering the count representative of the ON and OFF angles for that event.

Referring again to FIG. 13 once the memory control 103 has selected section number 1 and event number 1 its next action, as shown by box 114, is to read the primary and secondary angles from the memory 105 and store them. Since no event is controlled per se by the primary and secondary angles, there is no further logic function to be performed for event number 1 and the next step in the logic sequence, as indicated by box 115, is to increase the event number by 1. The memory control 103 then reads the event ON and OFF angles for that next event (i.e. event number 2) from the memory 104 and checks whether this event is to be associated with the primary angle or the secondary angle, as indicated by box 116. As a result of the decision arrived at regarding whether the event is associated with the primary or secondary angle, the memory control 103 proceeds to the next stage at which the primary or secondary angle, as appropriate, is added to both the ON and OFF angles for event number 2 as read from the memory 104.

If the sum of an event ON or OFF angle and the appropriate primary or secondary angle is greater than 1023, the memory control 103 automatically deducts 1024 from the total to obtain the correct count, notes that this count is in the following cycle, and remembers this fact when the required count is eventually reached.

The next step is for the memory control 103 to utilise the comparator 105 in order to answer the question "should the event be ON?". As indicated at box 118 in FIG. 12 this is equivalent to answering the question as to whether the count is both greater than or equal to the ON angle (as increased by the addition of the primary or secondary angle) and less than the OFF angle (also as increased by the addition of the primary or secondary angle, as appropriate).

The answer to this question is provided in the form of an output command signal from the comparator 105. This output command signal is either an ON signal or an OFF signal which is applied to all the output stages 108 (FIG. 12). There is an output stage 108 for each event and each output stage 108 contains an output circuit (for controlling a solenoid for the particular event) and the next stage in the logic sequence, as indicated by box 119 (FIG. 13), is to check the output circuit for the event under examination—in this case event number 2 of section number 1. This step is effected by a combination of the output command signal from the comparator 105 and an output address signal from the memory control 103 which, similarly to the output command signal, is applied to all the output stages 108. The output address signal causes the particular output stage 108 for event number 2 of section number 1 to receive the output command signal from comparator 105, and effect a change in the signal to the output circuit and solenoid, if this is not in the condition required by the output command signal.

When the question of box 119 has been answered and appropriate action taken, if necessary, the memory control 103 passes to the next step indicated at box 120 which is a check as to whether the event number is equal to 32. If it is not, as in the case under discussion when the event number equals 2, the memory control 103 is automatically caused to reset to box 115 which results in the event number being increased and the sequence of events denoted by boxes 116, 117, 118, 119 and 120 being repeated. The memory control 103 thus checks the condition of all the events for section number 1 until the event number equals 32 when the memory control 103 passes to the question "is the section number equal to 8?" as shown in box 121. As all that has so far been done is to scan all the electronic events in section 1, the answer to the question of box 121 is 'no' and memory control 103 therefore takes the loop 123 which results in the section number being increased by one in the step at box 124. The memory control 103 will then investigate section number 2 starting with event number 1 and repeating for section number 2 the process already described for section number 1. When this sequence has been repeated for all the sections, the section number will equal 8, which will signify the end of the core scan (box 125) and the memory control 103 will then move back to the start of the sequence at box 110 which requires it to wait until the receipt of another pulse indicates that the counter 102 has again been incremented by one.

Referring again to FIG. 12 there is shown a manual data entry means 127, for example a keyboard which enables changes to be entered into the memory 104 under control of the memory control 103. When the reheat time is to be changed without changing the relative timings of any of the events in either the primary or the secondary cycle, this may be done through the manual data entry means 127 which utilises data entry and status display control means 128 into which a new figure for either the primary or the secondary angle is recorded, displayed on status display 129 for checking, and then entered into the memory 104 to be stored as event 1 of the appropriate section. The entry of the new count for either the primary or the secondary angle into the memory 104 is effected under control of the memory control 103 at an appropriate time in the operation of the particular section, so as not to affect adversely any glassware forming cycle performed in the particular section. Conveniently, the new primary angle or secondary angle will be entered into the memory 104 at a time after the finish of one primary or secondary cycle and before the commencement of another such cycle. Then the next time that the particular primary or secondary cycle is commenced the whole cycle will have been advanced or retarded relative to either the secondary or the primary cycle by an amount corresponding to the change in the primary or secondary angle entered into the memory 104.

In practice variation in the reheat time will usually be achieved by varying the secondary angle stored in the memory 104 for the particular machine section. Adjustment of the primary angle by a small amount may be made for obtaining the optimum time for loading of a gob to the machine section, and such adjustment could be utilised to effect a small change in reheat time in appropriate circumstances.

In addition to the basic groups of events or machine functions which are performed at station A and station C and which together make up respectively the primary cycle or the secondary cycle as hereinbefore defined, other events in the operation of machine section are associated with either the primary or secondary angle. The timing of the operation of the first transfer means will be linked to the events of the primary cycle and therefore the primary angle will be added to the signals representative of the first transfer out and first transfer return. Similarly, the operation of the third transfer means will be linked to the events of the secondary cycle so that the stored counts for the operation of the third transfer means will have the secondary angle added to them.

The operation of the second transfer means and the support jaws 25 thereon, however, is linked to the change in the reheat time which is effected by the movement of either or both of the primary and secondary cycles. The movement of the second transfer means to return the support jaws 25 from their second position at station C to their first position at station B, and the closing of the support jaws 25 must be effected in coordination with the movement of the first transfer means and must therefore be effected at a count stored as a primary event associated with the primary angle of the primary cycle. Similarly, the movement of the second transfer means to move the support jaws 25, from their first position at station B to their second position at station C, and the opening of the support jaws 25 must be linked to the operation of the blow moulds 60, 60, and therefore these events must be effected as secondary events by signals linked to the secondary angle which controls the events of the secondary cycle.

However, in operation of the system as described with reference to FIG. 12 the condition of each event is checked at each count and it is therefore essential that an event ON angle corresponding to the condition "support jaws 25 close" be given on the occurrence of every pulse received by the counter from the time when the support jaws 25 close under the control of a primary event ON angle for the support jaws 25, until the time when the support jaws 25 open under the control of a secondary event which is an event OFF angle for the support jaws 25. This is achieved by providing event ON and event OFF angles for the support jaws 25 as both primary events and secondary events. The secondary event ON angle for support jaws 25 must always occur before the primary event OFF angle for those support jaws. The actuation of the support jaws is effected by a special output stage 108A which includes an OR gate connected to receive event ON signals in response to the two commands recorded in the memory 104 as a primary event and a secondary event, respectively.

Figure 14:
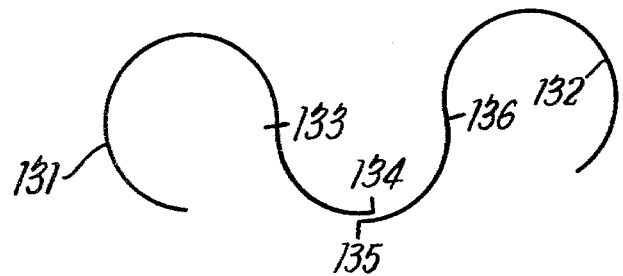
FIGS. 14 and 15 show diagrammatically the manner in which the operation of support jaws of the second transfer means are controlled in accordance with the system of FIGS. 12 and 13.
Figure 15:
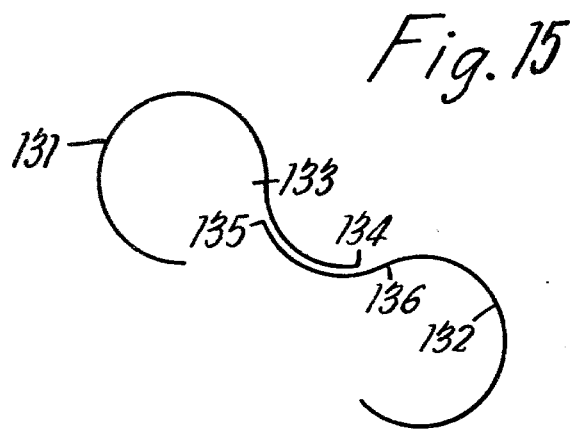

The effect of this arrangement is illustrated in FIGS. 14 and 15 which both show primary events by a line 131 and secondary events by a line 132. As already indicated, the primary events include the primary cycle, the actuation of the first transfer, the return movement of the second transfer, and event ON and OFF angles 133 and 134 for the support jaws 25. The secondary events on line 132 commence with an event ON angle 135 for support jaws 25 and also include an event OFF angle 136 for support jaws 25, and the forward movement of the second transfer.

FIG. 14 shows the relative positions of the event ON and OFF angles for the support jaws 25 giving a near-maximum reheat time at station B, while FIG. 15 shows the relative positions of the event ON and OFF angles for the support jaws 25 for a substantially shorter reheat time at station B, the shortening of the reheat time being represented by the extra extent of overlap of the lines 131 and 132 in FIG. 15 as compared with FIG. 14.

It will be appreciated that the support jaws 25, are kept closed by an event ON signal in FIG. 14 derived from the primary cycle through the OR gate of output stage 108A until a time denoted by point 135 in FIGS. 14 and 15 after which there are two ON signals supplied to the OR gate of output stage 108A until a time denoted by point 134 is passed. It is only when the count reaches the time denoted by point 136, which is on the secondary cycle, that there ceases to be an ON signal supplied to one or other of the inputs to the OR gate of output stage 108A, and the solenoid controlling support jaws 25 is de-energised so that these jaws open and the parison is transferred from the second transfer means to the blow mould at station C for final shaping of the article of glassware.

The apparatus in accordance with the present invention provides further substantial advantages over and above those derived from use of the apparatus of FIGS. 1 to 8 of the said co-pending Patent Application. In the first place the support jaws 25, 25 of the second transfer means are utilised for both supporting the parisons P, P at station B, while the parisons are reheating and being optionally subjected to other further forming or other treatment, and transferring the further formed parisons P', P' from station B to station C. This feature gives rise to the advantage that there is less handling of the finish on the parison during formation of the article of glassware than in the apparatus of FIGS. 1 to 8 of the said co-pending Patent Application, and also there is no requirement to provide separate support means at station B. These advantages derive directly from the fact that the operation of the second transfer means is entirely independent of the operation of both the first transfer means and the third transfer means.

In the embodiment of the present invention as hereinbefore described in which the support jaws 25, 25 of the second transfer means hold the parisons P, P at station B, the apparatus is enabled to handle single bead finishes, whereas the apparatus described with reference to FIGS. 1 to 8 of the said co-pending Patent Application requires the use of double bead finishes on the parisons and the articles of glassware.

Furthermore, by the provision of entirely independent transfer means for effecting the transfers between stations A, B and C and the deadplate, the movement of each transfer means is enabled to suit the state of the glass as it is being moved by that transfer means. Immediately after its formation at station A the parison is relatively stiff and may be moved quickly from station A to station B, but after reheating at station B the further formed parison is relatively soft and must be moved more slowly from station B to station C. However, after formation of the article of glassware at station C this is again relatively stiff and may be moved swiftly to a position over the deadplate.

Apparatus in accordance with the present invention provides a substantial time during which the article of glassware is suspended by the third transfer means over the deadplate 12. In both the examples given this deadplate hanging time is 264°. This deadplate hanging time is longer than that provided by the apparatus of FIGS. 1 to 8 of the said co-pending Patent Application as a result of the third transfer means being moved more quickly than the second transfer means.

The apparatus hereinbefore described in accordance with the present invention which has a blowhead assembly 62 at station C independent of both the second transfer means which transfers the further formed parisons to station C and the third transfer means which transfers articles of glassware out of station C, provides for maximum flexibility in the machine operations performed at station C in the formation of the articles of glassware G, G.

In the event that deformation of the finish of the article of glassware imposes a limitation on the rate of productivity, the apparatus hereinbefore described in accordance with the present invention which uses a triple-overlap cycle and three independent transfer means provides a further advantage. This advantage arises because the apparatus of the present invention allows for the incorporation of extended periods of controlled cooling of the finish.

The provision of apparatus in accordance with the present invention having three independent transfers enables the positions, times of operation and rates of acceleration of each of the three transfer means to be selected independently of similar properties of the other two transfer means. Both the first and second transfer means spend the majority of their time in their respective first positions, whereas the third transfer means spends the majority of its time in its second position. Furthermore, the time for which the second transfer means is in its first position overlaps the time for which the first transfer means is in its second position.

The apparatus which has been described with reference to FIGS. 1 to 9 of the accompanying drawings, provides for modification of a conventional I.S. machine by conversion of the conventional blow station into a reheating station B and the addition of a new blow station (essentially as illustrated in FIG. 8 of our U.K. Pat. No. 1,491,859) which consequential displacement of the deadplate 12 and conveyor 13 to the positions shown in those Figures, and the addition of two further independent transfers. The basic I.S. section frame 11 remains and the new blow station has its own separate frame 139. Accordingly the embodiment of the present invention described herein provides the improvements over the conventional I.S. machine as described in our said co-pending Application together with the advantages mentioned in the preceding paragraphs, whilst utilising a substantial proportion of the apparatus of the conventional I.S. machine. I.S. machines which are already in use by makers of articles of glassware may thus be converted and modified to provide the three station machine with three independent transfers as hereinbefore described with reference to the accompanying drawings, with the advantages resulting therefrom.

A glassware forming machine section in accordance with the present invention may include other apparatus features, for example the third transfer could move the articles of glassware in a horizontal straightline motion.

Instead of a fixed blowhead assembly located at station C, the blowhead assembly could be combined with the third transfer means, but with the blowheads displaced from the tong heads of the third transfer means by a distance equivalent to the distance between the positions at which articles of glassware are suspended over the deadplate and the positions at which they are formed in the blow moulds.

I claim:

1. A process of forming glassware from a gob of molten glass in an individual section of a multiple section glassware forming machine, which section has three stations spaced apart longitudinally of the section, wherein a primary cycle comprising the machine functions for forming a parison in an inverted position from the gob of molten glass is performed in the first of said stations, a secondary cycle comprising the machine functions for forming an article of glassware in a blow mould is performed at the third of said stations, the parison is moved from the first station to the second station in a first time by a first transfer means which presents the parison in an upright position at the second station, the parison is moved from the second station to the third station by a second transfer means in a second time, the article of glassware is removed from the third station to a take-out position beyond the third station by a third transfer means in a third time, whereby the period elapsing between the time at which the first transfer means presents the parison to the second station and the time at which the second transfer means moves the parison from the second station to the third station is adjustable without altering the relative timing of any of the machine functions comprised within either the primary cycle or the secondary cycle, and wherein each of the parison, the further formed parison, and the article of glassware is moved by the first, second and third transfer means, respectively, at rates of acceleration suitable for the condition of the glass contained therein at the time of movement.

2. A process according to claim 1 wherein articles of glassware having single bead finishes are produced by positioning support jaws of the second transfer means at the second station before releasing the parison from the first transfer means so that the parison drops into engagement with the support jaws of the second transfer means, and by opening the support jaws of the second transfer means at the third station after the blow mould has been closed so that the further formed parison drops into engagement with the blow mould and wherein, after opening the blow mould, the third transfer means engages the bead for removing the article of glassware from the third station to a take-out position.

3. An individual section of a multiple section glassware forming machine which comprises three operating stations which are, respectively, a first station including a blank mould for forming a parison in an inverted position from a gob of molten glass delivered to the blank mould, a second station in which reheating of a parison takes place, and a third station including a blow mould for finally shaping an article of glassware, first transfer means including a neck ring structure and actuating means for moving the neck ring structure from a first position in which the neck ring structure engages a parison in an inverted position in the blank mould at the first station to a second position in which the neck ring structure presents the parison in an upright position for release at the second station and returning the neck ring structure from the second position to the first position prior to the formation of another parison in the blank mould at the first station, second transfer means including first gripping means for supporting a parison and actuating means for moving the first gripping means between a first position in which the first gripping means supports a parison at the second station, and a second position in which the first gripping means supports the parison in such a location at the third station that the blow mould at the third station can close around the parison, and a third transfer means including second gripping means and actuating means for moving the second gripping means between a first position in which the second gripping means engages an article of glassware at the third station, and a second position in which the second gripping means holds the article of glassware at a takeout position, the actuating means of each of the first, second and third transfer means being operable independently of the other two actuating means, whereby each of the neck ring structure, the first gripping means and the second gripping means is movable between its first and second positions at times and rates of acceleration independent of the times of movement and rates of acceleration of the other transfer means.

4. A glassware forming machine section according to claim 3 wherein the third station further includes a blowhead assembly, the blowhead of which is movable for engaging the finish of a further formed parison supported in the blow mould.

5. A glassware forming machine section according to claim 3 wherein the actuating means of the second transfer means is effective to move the first gripping means in a straight line horizontal motion.

6. A glassware forming machine section according to claim 5 wherein the second transfer means comprises guide rods and a carriage slidable on the guide rods, the carriage supporting the first gripping means.

7. A glassware forming machine section according to claim 3 wherein the actuating means of the third transfer means is effective to move the second gripping means in an arcuate movement between its first position and its second position.

8. A glassware forming machine section according to claim 3 further including means for varying the time for which the parison is supported in the second station and for simultaneously effecting corresponding consequential changes in either a group of machine functions constituting a primary cycle for the formation of a parison at the first station, or a group of machine functions constituting a secondary cycle for the formation of an article of glassware from a further formed parison at the third station.

* * * * *

UNITED STATES PATENT AND TRADEMARK OFFICE
CERTIFICATE OF CORRECTION

PATENT NO. : 4,255,177
DATED : March 10, 1981
INVENTOR(S) : Frank A. Fenton

It is certified that error appears in the above—identified patent and that said Letters Patent is hereby corrected as shown below:

Col. 1, line 7 - "Ser. No. 026,646" should read --Ser. No. 024,646--

Col. 1, line 18 - "Ser. No. 026,646" should read --Ser. No. 024,646"

Col. 4, line 51 - "cyclinder" should read --cylinder--

Col. 11, line 57 - "on" should read --one--

Col. 11, line 61 - "mamory" should read --memory--

Col. 13, line 2 - "Fig. 12" should read --Fig. 13--

Signed and Sealed this

First Day of September 1981

[SEAL]

Attest:

GERALD J. MOSSINGHOFF

Attesting Officer

Commissioner of Patents and Trademarks